Patented June 22, 1948

2,443,818

UNITED STATES PATENT OFFICE 2,443,818

OXIDATION OF MESITYL OXIDE WITH MOLECULAR OXYGEN

Alec Elce, Banstead, Reginald Harold Hall, Sutton, and Karl Heinrich Walter Tuerck, Banstead, England, assignors to The Distillers Company, Limited, Edinburgh, Scotland, a British company No Drawing. Application March 4, 1946, Serial No. 651,984. In Great Britain February 26, 1945

Section 1, Public Law 690, August 8, 1946
Patent expires February 26, 1965

11 Claims. (Cl. 260—526)

This invention is for improvements in or relating to the oxidation of aliphatic ketones.

It is well known that by the oxidation of saturated aliphatic ketones with molecular oxygen in the liquid phase there are produced carboxylic acids formed by oxidation of the ketonic molecule at the carbonyl group. Thus, for instance, the oxidation of methyl-ethyl ketone with molecular oxygen produces acetic and propionic acids.

We have found that by subjecting mesityl oxide to oxidation with molecular oxygen in the presence of an oxidation catalyst in the liquid phase there is produced alpha-methyl-beta-acetyl acrylic acid. This result is completely unexpected having regard to the known reaction with saturated aliphatic ketones to produce carboxylic acids, containing a lesser number of carbon atoms than the ketone, by oxidation at the carbonyl group. The process of the present invention produces an acid having the same number of carbon atoms as the unsaturated ketone from which it is produced.

Alpha-methyl beta-acetyl acrylic acid is a compound which is valuable as an intermediate in the synthesis of various other products and so far as we are aware has only been produced hitherto by a complicated series of reactions utilizing 2.4-dimethyl pyrrols.

According to the present invention, therefore, there is provided a process for the manufacture of alpha-methyl-beta-acetyl acrylic acid by the oxidation of mesityl oxide by intimate contact with molecular oxygen in the liquid phase in the presence of an oxidation catalyst. Suitable oxidation catalysts are those known in the art, for promoting oxidation in the liquid phase by molecular oxygen; particularly suitable catalytic metals are manganese, nickel, copper, cobalt and vanadium which may most conveniently be used in the form of their organic salts, e. g. as the metal acetates. Mixtures of oxidation catalysts may be used.

The oxidation reaction is preferably carried out at a temperature between 70° and 120° C. and the liquid phase conditions can be achieved with or without a diluent i. e. mesityl oxide may be subjected directly to the action of gaseous oxygen without the necessity for the use of a liquid diluent. Where a diluent is used it should be one which is stable under the oxidation conditions and may be a liquid aliphatic acid such as acetic acid or an alkyl ester of an aliphatic acid.

Alpha-methyl beta-acetyl acrylic acid is a crystalline solid melting at 100° C.; it has a boiling point of 100° C. at ½ mm. of mercury and it may conveniently be recovered from the reaction mixture by distillation at a reduced pressure; the acid may be isolated and purified by crystallisation.

It is desirable to effect the separation of the alpha-methyl beta-acetyl acrylic acid from the reaction mixture as rapidly as possible after its formation owing to its tendency to resinify, and according to a feature of the invention, therefore, the reaction mixture is first directly distilled, under reduced pressure, from any high boiling residue, and the distillate then subjected to a reduced pressure fractionation, preferably at pressures of 1 mm. of mercury.

We have also found that it is advantageous to restrict the conversion of the mesityl oxide in the reaction mixture and according to an important feature of our invention, therefore, the mesityl oxide is oxidised to an extent not exceeding 50% by weight of that present in the initial reaction mixture. A preferred method of carrying the invention into effect consists in oxidising mesityl oxide in a continuous process whilst withdrawing from the oxidiser continuously, a mixture containing not less than 50% by weight of unchanged mesityl oxide.

The following example illustrates the manner in which the invention may be carried into effect, the proportions and percentages referred to being calculated as by weight.

*Example:*—Into an agitating vessel, provided with a reflux condenser, a mixture of 2100 parts of mesityl oxide (B. P. 126° C./760 mm. Hg) 900 parts of acetic acid, 1.5 parts of cobalt acetate and 0.2 part of copper acetate is introduced and is maintained at 100° C.; oxygen is then introduced into the vessel in intimate contact with the reaction mixture at such a rate that the effluent gas contains at least 50% oxygen. When the absorption of oxygen has practically ceased, the liquid in the oxidiser is distilled under reduced pressure. After separating off the unchanged mesityl oxide together with the acetic acid as distillate, the residue was fractionated under a high vacuum. Three distinct fractions were obtained, boiling at 48–53° C., 87–89° C., and 92–120° C. respectively at a pressure of 1 mm. The highest boiling fraction, as well as the residue, is mostly alpha-methyl beta-acetyl acrylic acid. The other two fractions are also oxygenated products of mesityl oxide, i. e. they are products which contain at least the same number of carbon atoms as does mesityl oxide and in which the ratio of carbon atoms to oxygen atoms is lower than 6:1.

The lowest boiling fraction has been purified and its physical characteristics and its formula determined. These are as follows:

Boiling point 48–50° C./1 mm., 164° C./760 mm.,
Refractive index $n_D^{20.3}=1.4373$
Molecular weight 120 approximately
General formula $C_6H_{10}O_2$ It has not yet been possible to assign a constitutional formula to the compound but it has been ascertained that the compound is soluble in water, is neutral and contains an acetyl group. On treatment with alkali, it yields acetone whilst, on treatment with acid, it yields methylglyoxal.

What we claim is:

1. A process for the manufacture of alpha-methyl-beta-acetyl-acrylic acid which comprises subjecting mesityl oxide dissolved in an inert organic diluent, in the liquid phase, to oxidation by intimate contact with molecular oxygen in the presence of an oxidation catalyst selected from the group consisting of compounds of manganese, nickel, copper, cobalt and vanadium and mixtures thereof at a temperature between 70° and 120° C.

2. A process for the manufacture of alpha-methyl-beta-acetyl-acrylic acid which comprises subjecting mesityl oxide dissolved in an inert organic diluent, in the liquid phase, to oxidation by intimate contact with molecular oxygen in the presence of an oxidation catalyst selected from the group consisting of compounds of manganese, nickel, copper, cobalt and vanadium and mixtures thereof at a temperature between 70° and 120° C., and thereafter promptly distilling the reaction mixture under vacuum to recover the monomeric acid therefrom.

3. A process according to claim 2 wherein the oxidation is stopped when not more than half the mesityl oxide has been oxidised.

4. A continuous process for the manufacture of alpha-methyl-beta-acetyl-acrylic acid which comprises continuously feeding liquid mesityl oxide into an oxidiser maintained at a temperature between 70° and 120° C., feeding molecular oxygen into the liquid mesityl oxide in the oxidiser in intimate contact therewith in the presence of an oxidation catalyst selected from the group consisting of manganese, nickel, copper, cobalt and vanadium and mixtures thereof and continuously withdrawing from said oxidiser a reaction mixture containing unchanged not less than 50% by weight of the mesityl oxide introduced into the oxidiser.

5. A continuous process according to claim 4 wherein the said withdrawn reaction mixture is subjected to vacuum distillation for the recovery of said acid therefrom.

6. As a new composition of matter, a liquid compound of the constitutional formula $C_6H_{10}O_2$, molecular weight approximately 120, refractive index $n_D^{20.3}=1.4373$, boiling point 48°–50° C./1 mm. and 164° C./760 mm., containing an acetyl group, being of neutral reaction, reacting with alkalis to yield acetone, reacting with acids to yield methylglyoxal and derivable from mesityl oxide by catalytic oxidation in the presence of an oxidation catalyst selected from the group consisting of compounds of manganese, nickel, copper, cobalt and vanadium and mixtures thereof in the liquid phase at a temperature between 70° and 120° C. with molecular oxygen.

7. In a process for the manufacture of alpha-methyl-beta-acetyl-acrylic acid which comprises subjecting mesityl oxide, in the liquid phase, to oxidation by intimate contact with molecular oxygen in the presence of an oxidation catalyst, and thereafter promptly distilling the reaction mixture under vacuum to recover a low-boiling fraction having a boiling point of 48° to 50° C./1 mm., refractive index $n_D^{20.3}=1.4373$, molecular weight approximately 120, constitutional formula $C_6H_{10}O_2$ and containing an acetyl group.

8. A process for the manufacture of alpha-methyl-beta-acetyl-acrylic acid which comprises subjecting mesityl oxide, in the liquid phase, to oxidation by intimate contact with molecular oxygen in the presence of an oxidation catalyst selected from the group consisting of compounds of manganese, nickel, copper, cobalt and vanadium and mixtures thereof at a temperature between 70° and 120° C.

9. A process for the manufacture of alpha-methyl-beta-acetyl-acrylic acid which comprises subjecting mesityl oxide, in the liquid phase, to oxidation by intimate contact with molecular oxygen in the presence of an oxidation catalyst comprising a copper salt at a temperature between 70° and 120° C.

10. A process for the manufacture of alpha-methyl-beta-acetyl-acrylic acid which comprises subjecting mesityl oxide, in the liquid phase, to oxidation by intimate contact with molecular oxygen in the presence of an oxidation catalyst comprising a cobalt salt at a temperature between 70° and 120° C.

11. A process for the manufacture of alpha-methyl-beta-acetyl-acrylic acid which comprises subjecting mesityl oxide, in the liquid phase, to oxidation by intimate contact with molecular oxygen in the presence of an oxidation catalyst comprising a mixture of the acetates of copper and cobalt at a temperature between 70° and 120° C.

ALEC ELCE.
KARL HEINRICH WALTER TUERCK.
REGINALD HAROLD HALL.

REFERENCES CITED

The following references are of record in the file of this patent:

UNITED STATES PATENTS

| Number | Name | Date |
|---|---|---|
| 2,005,183 | Flemming et al. | June 18, 1935 |
| 2,192,142 | Meitzner | Feb. 27, 1940 |
| 2,241,487 | Slotterbeck | May 13, 1941 |
| 2,299,013 | Flemming et al. | Oct. 13, 1942 |

FOREIGN PATENTS

| Number | Country | Date |
|---|---|---|
| 395,435 | Germany | May 19, 1924 |

OTHER REFERENCES

Doeuvre: Bull. Soc. Chim. de France (4), vol. 39, pp. 1595–1597 (1926).

Slawinski: Chem. Abstracts, vol. 13, pp. 2867–2868 (1919).